No. 732,799. PATENTED JULY 7, 1903.
W. H. TROUT & G. M. HINKLEY.
BAND SAW GUIDE.
APPLICATION FILED DEC. 9, 1902.
NO MODEL. 5 SHEETS—SHEET 3.
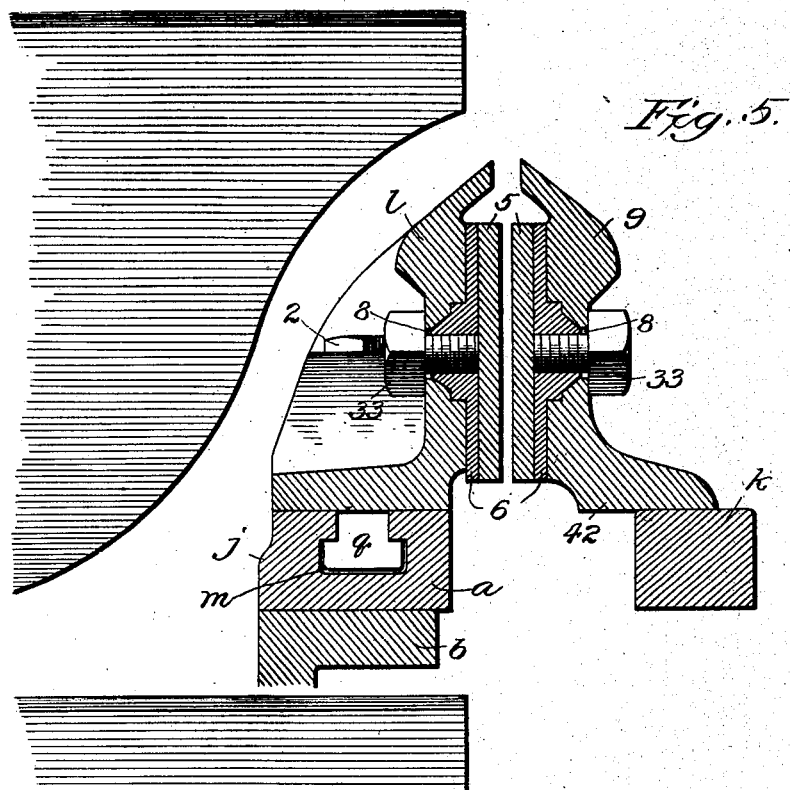
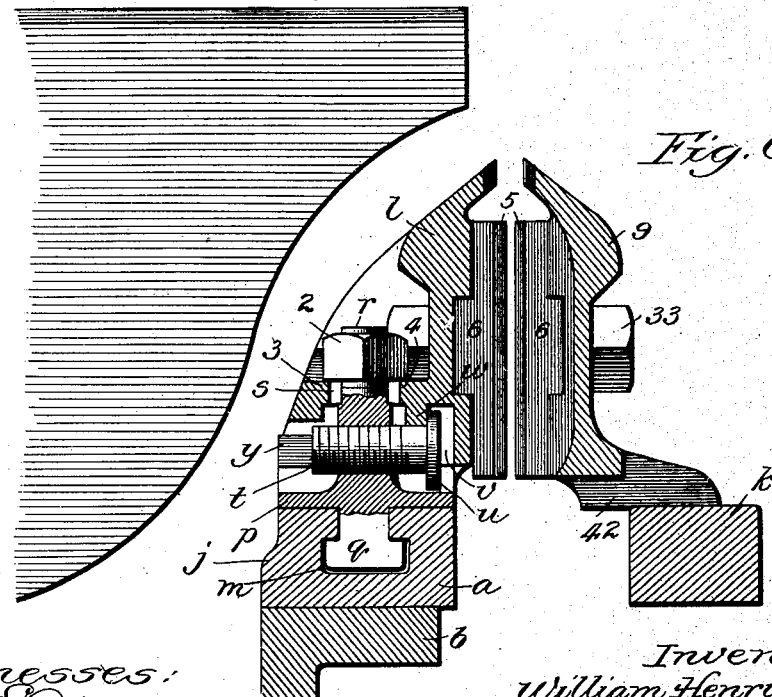
Witnesses:
Inventors:
William Henry Trout &
George M. Hinkley,
By Thomas F. Sheridan,
Att'y.

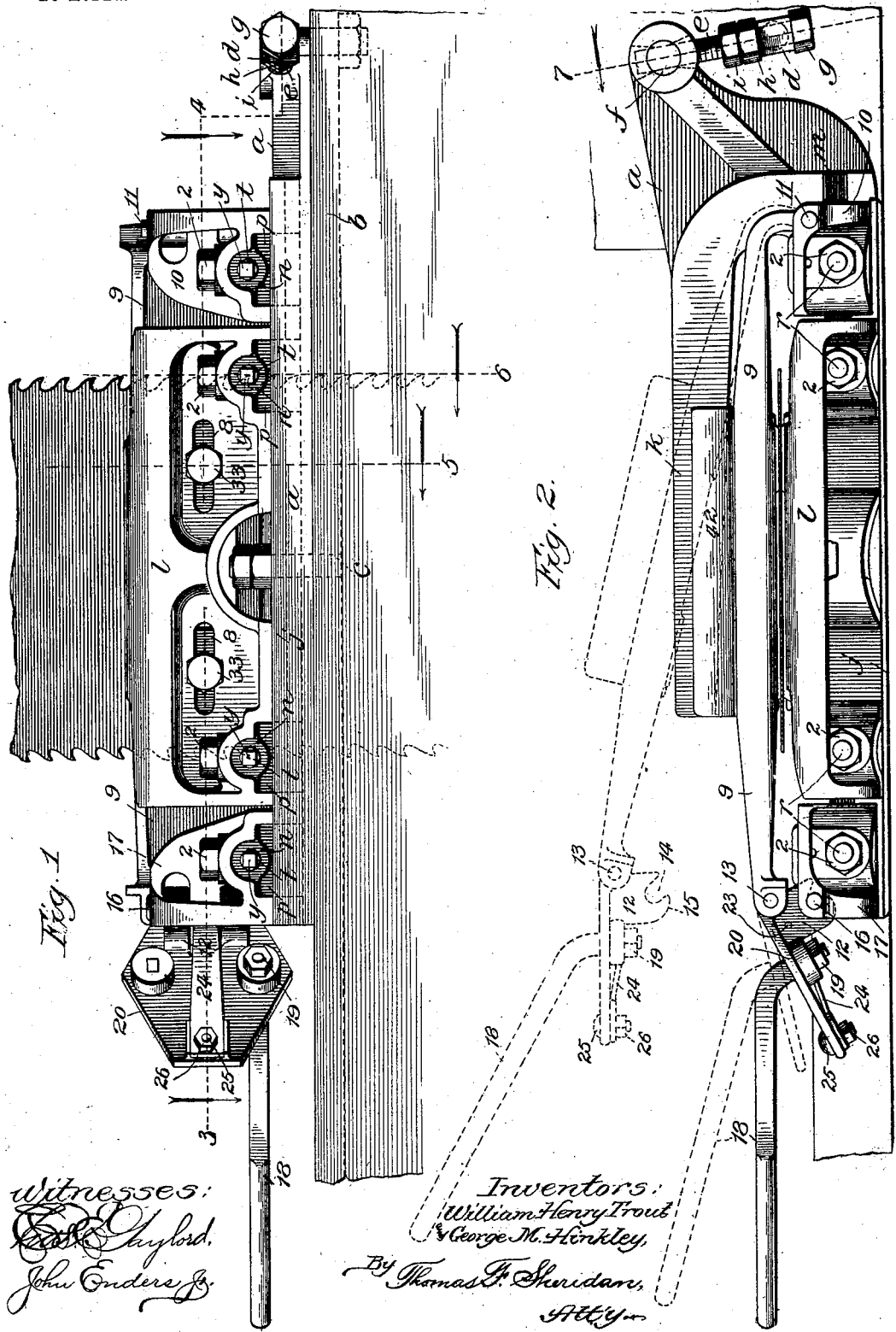

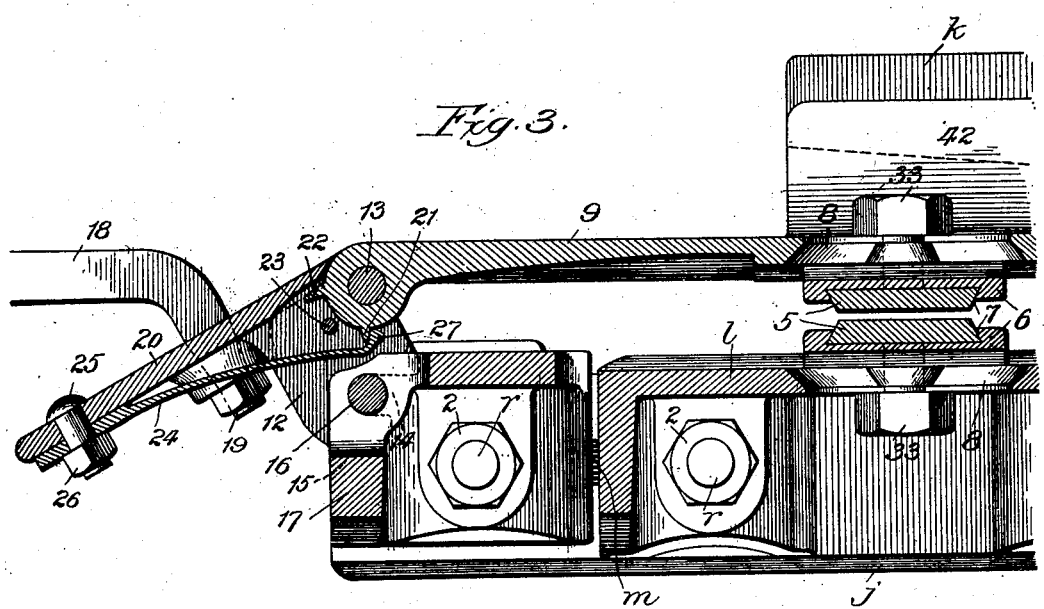
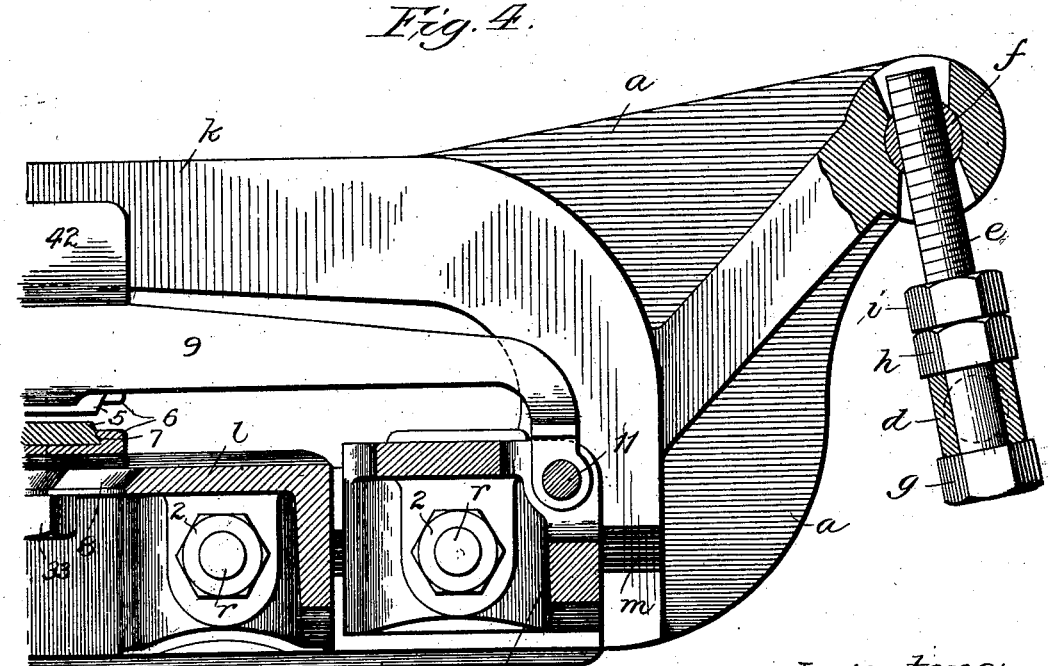

No. 732,799. PATENTED JULY 7, 1903.
W. H. TROUT & G. M. HINKLEY.
BAND SAW GUIDE.
APPLICATION FILED DEC. 9, 1902.
NO MODEL. 5 SHEETS—SHEET 4.
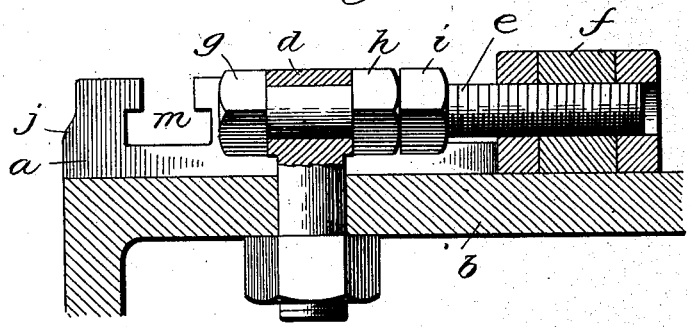
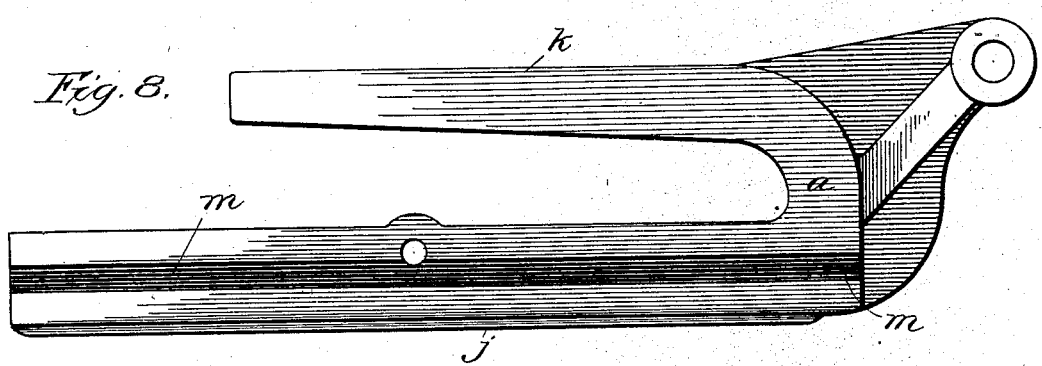
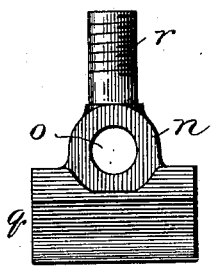
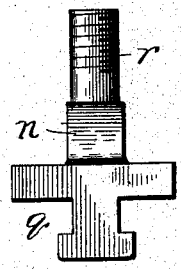
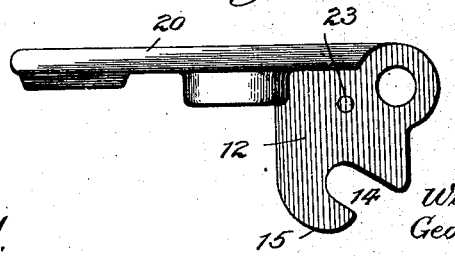
Inventors:
William Henry Trout &
George M. Hinkley,
By Thomas F. Sheridan,
Att'y
Witnesses:

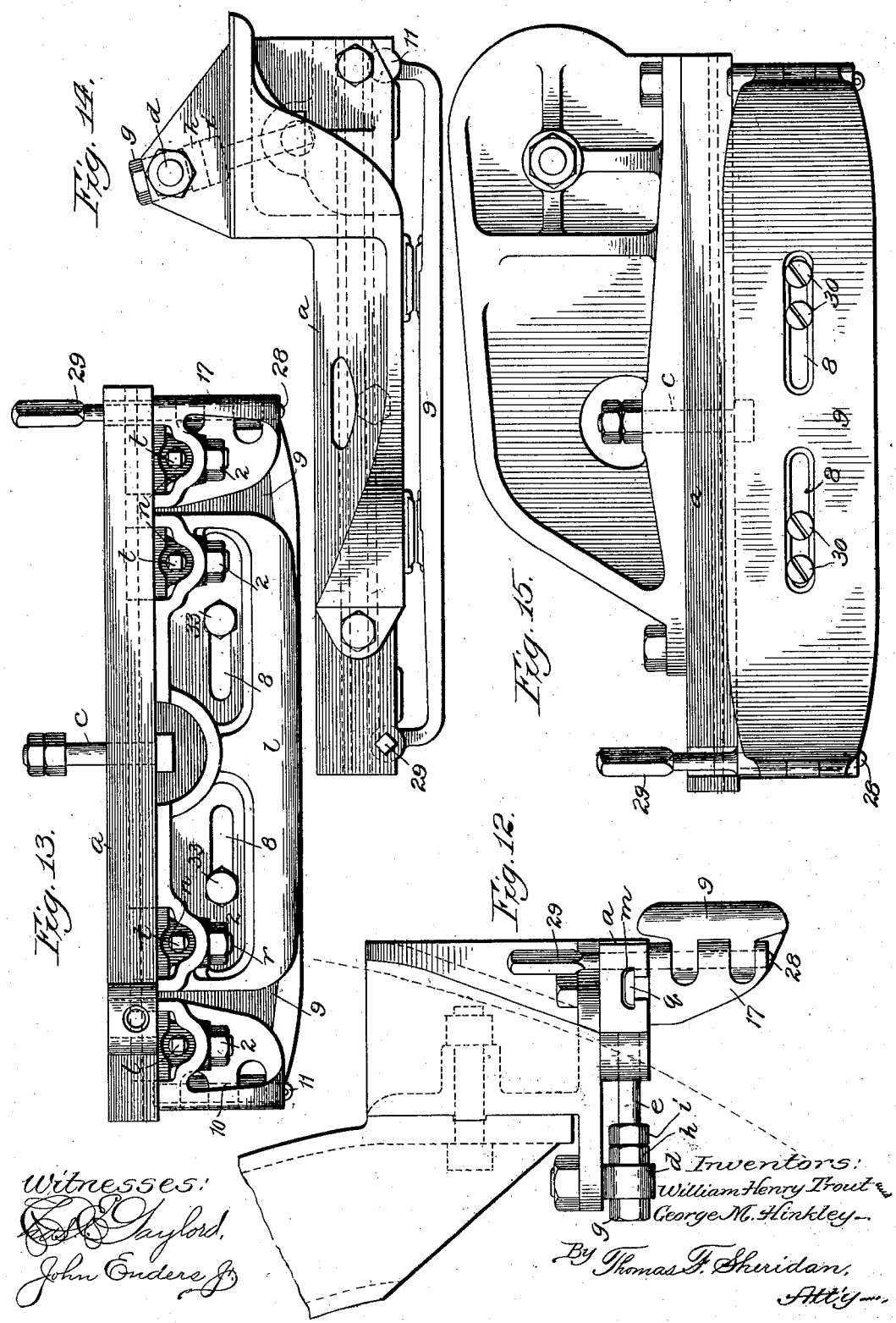

No. 732,799. Patented July 7, 1903.

UNITED STATES PATENT OFFICE.

WILLIAM H. TROUT AND GEORGE M. HINKLEY, OF MILWAUKEE, WISCONSIN, ASSIGNORS OF ONE-HALF TO ALLIS-CHALMERS COMPANY, OF CHICAGO, ILLINOIS, A CORPORATION OF NEW JERSEY.

BAND-SAW GUIDE.

SPECIFICATION forming part of Letters Patent No. 732,799, dated July 7, 1903.

Application filed December 9, 1902. Serial No. 134,476. (No model.)

*To all whom it may concern:*

Be it known that we, WILLIAM HENRY TROUT and GEORGE M. HINKLEY, citizens of the United States, residing at Milwaukee, in the county of Milwaukee and State of Wisconsin, have invented certain new and useful Improvements in Band-Saw Guides, of which the following is a specification.

Our invention relates to that class of band-saw guides having friction-strips or guide-plates held in position by supporting bars or housings.

It relates, further and particularly, to the means for holding the guide-plates or friction-strips in position and to the means for adjusting the guide-plate holders, and thereby the guide-plates.

It relates also to the means for protecting the guiding mechanisms and to the means for opening and closing the guide-plate-holding device and for holding the parts firmly and efficiently in position.

The principal object of this invention is to provide a simple, economical, and efficient guiding mechanism for band-saws.

A further object of the invention is to provide band-saw guides inclosed in such a manner that the pressure strains are entirely within inclosing and retaining connections.

A further object is to provide guide-plate-supporting side bars or housings adapted to hold the friction-strips or guide-plates in operative position and to provide the device with guards for throwing off slabs and lumber from contact with the guiding mechanism and saw.

A further object is to provide efficient means for readily opening and closing the guides.

Other and further objects of the invention will appear from an examination of the drawings and the following description and claims.

The invention consists in the features, combinations, and details of construction hereinafter described and claimed.

In the accompanying drawings, Figure 1 is a longitudinal elevation of a guide constructed in accordance with our improvements; Fig. 2, a plan view of the same looking downward and showing the guide in closed position and the open position of the movable guide-plate-supporting bar in dotted lines; Fig. 3, a sectional plan view of one end of the guides, taken on line 3 of Fig. 1 looking downward; Fig. 4, a sectional plan view of the opposite end, taken on line 4 of Fig. 1 looking downward; Fig. 5, a sectional elevation, taken on line 5 of Fig. 1, showing the guide-plates or friction-strips and means for holding them in position; Fig. 6, a sectional elevation, taken on line 6 of Fig. 1, showing the means for holding the outer guide-plate-supporting housing adjustably in position upon the base-plate; Fig. 7, a sectional view in elevation of the adjusting-belt mechanism for adjusting the base-plate, taken on line 7 of Fig. 2 looking in the direction of the arrow; Fig. 8, a plan view of the base-plate looking downward; Fig. 9, a detail view in side elevation of one of the housing and bracket holders shown in Fig. 6; Fig. 10, a detail view, in end elevation, of the housing and bracket holder shown in Fig. 9; Fig. 11, a detail of the locking-dog and guard for holding the movable guide-arm in closed position and guarding the device; Fig. 12, an end elevation of an upper guide, showing it connected to the supporting-arm of a mill; Fig. 13, a longitudinal elevation of the upper guide shown in Fig. 12; Fig. 14, a plan view of the upper guide looking downward, and Fig. 15 a longitudinal elevation of the upper guide looking in a direction opposite to that indicated in Fig. 13.

In the art to which this invention relates it is desirable that a pair of guides be provided adapted to serve as upper and lower guides, respectively, for a band-saw, which may be either a single or a double cutting saw, and that such guides be substantially identical in construction, so that the lower guide, as hereinafter described, may serve as the upper one, requiring only slight modifications, as are herein indicated. In order to disclose the invention, therefore, it is only necessary to describe the lower guide and the modifications of construction necessary to produce the upper one.

In constructing a guide in accordance with our improvements we provide a base-plate *a*, which is held in position upon the mill bedplate b by means of a center stud c, as shown in Fig. 1, which forms a fulcrum for adjusting the guide base-plate in desired alinement with relation to the saw. In order to enable such adjustment to be readily accomplished, a squared stud d, having a perforation through the upper squared end thereof, is secured to the mill bed-plate near one end of the base-plate and provided with an adjusting-bolt e, mounted in the above-mentioned perforation in the squared end of the stud and in threaded connection with a nut-pin f on the end of the base-plate, as shown in Figs. 2 and 7. This adjusting-bolt is provided with a head g, which contacts the squared head of the bolt d and is provided with an adjusting-nut h and a locking-nut i, by means of which it is adjusted and held in locked position. The base-plate is provided with an outer arm j, which extends on the outside of the saw, and an inner arm k, which extends on the inside thereof and which forms the base upon which the outer and inner housings and friction-strips or guide-plates are respectively mounted. An outer housing l is mounted upon the outer arm of the base-plate for holding the outer guide-plates, hereinafter described, in position and arranged to extend over the edges of such guide-plates and form a shield, as well as a support for the guide-plates and their supporting-plates. It is very desirable that means be provided for enabling this housing and the guide-plates held thereby to be readily adjusted transversely and longitudinally of the base-plate. To accomplish this, the outer arm of the base-plate is provided with a T-shaped slot m in its upper surface, which extends longitudinally thereof throughout its entire length and in which are mounted housing and bracket holders n, (see Fig. 6,) each of which holders comprises a central body or nut portion having a threaded bore o therethrough, a projecting base p, which rests upon the upper face of the base-plate, a depending head portion q, adapted to slidingly engage the shouldered slot of the base-plate and hold the holder slidably in position thereon, and an upwardly-projecting threaded bolt portion r, which extends through a perforation s in the housing when the holder is in operative position.

An adjusting-screw t is mounted in the bore of the body portion of the holder above described, so as to extend horizontally therethrough or at an angle to the axial center of the holder, and is provided with a collar u at one end, rotatably mounted in a pocket v of the housing and in contact with a shoulder w, which forms the edge of such pocket. This adjusting-screw is provided with a squared end y, by means of which it may be operated with the aid of a key or wrench. By this arrangement it will be seen that each end of the outer housing being provided with one of the holders and adjusting-screws, as above described, such housing may be readily adjusted transversely of the base-plate by turning the adjusting-screws in the desired direction and held firmly in position when so adjusted by means of the binding-nut 2, which is in threaded engagement with the upwardly-projecting bolt portion of the holder and which engages shoulders 3 and 4 of the housing.

Antifriction strips or guide-plates 5, made, preferably, of Babbitt metal, are mounted in the housing and held in position by means of guide-plate holders 6, each of which is provided with perpendicular dovetailed slots 7, adapted to hold the guiding strips or plates removably in position. It is desirable that these guide-plates be held adjustably in position longitudinally of the housing, as well as transversely, so that they may be readily adjusted to conform to the varying widths of the saw employed. To accomplish this purpose, the housing is provided with longitudinal slots 8, in which are mounted tap-bolts 33, which in turn are in threaded engagement with the guide-plate holders 6. For holding similar guide-plates in position on the opposite side of the saw and to enable them to be readily adjusted with relation to those already described a "movable housing-bar" or "guide-plate-supporting arm" 9, as we prefer to term it, is provided, which extends when in closed position on the opposite or inner side of the saw parallel with the outer housing already described. The housing portion of the arm 9 extends over the edges of the guide-plates and forms a shield as well as a support for the guide-plates and their supporting-plates. This movable guide-plate-supporting arm is pivotally mounted at one end upon bracket 10 by means of a pivot-pin 11 and is provided with a planed flange portion 42, which slidingly contacts the inner arm k of the base-plate and is held firmly thereby against the strain of the saw, which is always in the same direction. This supporting end bracket is held in position so that it may be readily adjusted both transversely and longitudinally of the base-plate by means of holder and adjusting-screw mechanism identical with that shown and described for holding the housing l in position, the holder for the bracket being mounted adjustably in the same longitudinal slot in the base-plate and provided with adjusting-screw mechanism of the same description.

To hold the movable supporting-arm in closed position and permit it to be readily opened and closed by a single operation, the swinging end thereof is provided with a connecting-guard 20 and locking-dog 12, pivotally mounted thereon by means of a pivot 13, and provided with a recess 14, forming a locking lug or jaw 15, which when in locked position engages a locking-pin 16, mounted in a bracket 17, which bracket, like the bracket 10, is held in position to be readily adjusted both transversely and longitudinally of the base-plate by means of holder and adjusting mechanism identical with that of the outer housing-plate. The holders for both brackets and the outer supporting-housing are all mounted slidably upon the base-plate and in the same longitudinal slot.

The pivoted supporting-arm and the locking-dog thereon are both operated by means of an operating lever-arm 18, which is mounted upon the locking-dog by means of a nut 19 upon the threaded end thereof. This operating lever-arm is placed on the lower side of the locking-dog and at such an angle that when the dog is in locking position the lever-arm forms a guard which protects the guide mechanism and saw from contact with slabs and lumber. To further protect the parts from injury, which might be caused by the returning lumber, particularly when a double-cutting saw is in use, the locking-dog is provided with a broad inclined guard portion 20, which forms a guard for the entire end portion of the guide mechanism and serves as a means for connecting the operating lever-arm and locking-dog proper. This guard may, however, be made integral with the locking-dog and for the purposes of this description may be referred to as a part thereof.

It is very desirable that means be provided whereby the pivoted guide-supporting arm may be moved into closed position, locked, and the locking-dog secured in such position by the same operation of the operating lever-arm and so that the movement of the operating lever-arm in the opposite direction will cause the locking-dog to become disconnected and the guide-supporting arm to move into its open position. To accomplish these purposes, the swinging end of the supporting-arm is provided with an inner lug 21 and an end lug 22, and an operating-pin 23 is mounted on the locking-dog between such lugs, so that the movement of the operating lever-arm in a direction to open the guide will cause the pin to contact the end lug. A spring 24 is mounted upon the guard 20, to which it is firmly attached by means of a bolt 25 and nut 26, with its curved free end 27 extending inside of the inner lug of the supporting-arm when the parts are in locked position, so as to prevent the accidental unlocking of the parts, and adapted to spring into position on the outside of such inner lug when the lever-arm is moved in the opening direction and the dog is in open position. It will thus be readily understood that the parts being in the position shown in Fig. 3 the movement of the operating-lever arm in a direction to open the guide-supporting arm will cause the spring to snap into position between the lugs of the supporting-arm, leaving the locking-dog free to open. The pin 23 will thus contact the end lug and cause the supporting-lever to move into its open position in response to the movement of the operating-lever. In order to close the parts, the spring being between the lugs, the movement of the operating-lever in the closing direction causes the spring to contact the outside of the inner lug sufficiently to hold the locking-dog in open position until its jaw contacts the locking-pin of the bracket. A continuation of the movement then causes the spring to snap to the inner side of the lug and hold the parts in locking position, as shown in Fig. 3.

Guide-plates of Babbitt metal identical with those described as mounted in the outer housing are mounted in the same manner upon the swinging supporting-arm, so as to be moved into operative position against the saw by the movement of the arm and held firmly in place thereby. It will be readily seen that by this arrangement the supporting-bracket upon which the swinging arm is pivotally mounted is adjustable independently of the outer guide-plates and their immediate supports and that the locking-bracket, with its locking-pin which holds the swinging end of the supporting-arm, is likewise independently adjustable. The swinging supporting-arm and its guide-plates may therefore be readily adjusted into the desired position with relation to the saw and also with relation to the guide-plates on the opposite side of the saw, while the outer guide-plates being mounted upon independently-adjustable supports may likewise be readily adjusted both transversely and longitudinally of the guide with reference to the saw and to the other parts of the guide mechanism, and, furthermore, the guide plates or strips are thus held firmly in position from points on opposite sides of the saw, so that the entire strain due to the operation of the saw is received by the guide mechanism between the points of support. To further protect the guide mechanism, the upper edges of both the outer and inner housings are arranged at an incline upwardly and inwardly toward the saw, as shown in Fig. 5, so as to form a suitable guard.

Having described the lower guide mechanism in detail, it will be sufficient to say that the upper guide is identical therewith in all respects with the exception of mere comparatively insignificant details, and that the differences in these respects are set forth in Figs. 12, 13, 14, and 15, which sufficiently illustrate the upper guide when considered in view of the foregoing description and the views of the lower guide. By referring to these figures it will be seen that in order to serve as an upper guide the lower guide need only be inverted and that the quick-opening lever, locking-dog, and guard not being required a plain hinged pin 28 and handle 29 are substituted therefor and that countersunk slotted screws 30 are substituted for the tap-bolts 33, which hold the guide-plate supports in position, the slot 8 being beveled, as shown in Fig. 15.

We claim—

1. In mechanisms of the class described, the combination of guide-plates mounted adjacent to opposite sides of a saw to be guided thereby, supporting-housings in which such guide-plates are mounted, provided with shield portions for protecting the guide-plates, and means for holding the guide-plates adjustably in position, substantially as described.

2. In mechanisms of the class described, the combination of guide-plates mounted adjacent to opposite sides of a saw to be guided thereby, supporting-plates provided with slots in which such guide-plates are mounted, means for holding the supporting-plates adjustably in position, and a pivoted arm upon which the supporting-plates and guide-plates, for one side of the saw, are mounted extending along one side of the saw and beyond both edges to the opposite side thereof, substantially as described.

3. In mechanisms of the class described, the combination of two pairs of guide-plates formed of Babbitt metal, supporting-plates in which such guide-plates are removably mounted, supporting-housings in which the supporting-plates are adjustably mounted, provided with shield portions extending over the guide-plates, and means for holding the supporting-plates and thereby the guide-plates in position, substantially as described.

4. In mechanisms of the class described, the combination of a base-plate, supporting-housings mounted thereon, provided with shield portions extending over the guide-plates, guide-plates mounted in such housings, and means for holding such guide-plates in position, substantially as described.

5. In mechanisms of the class described, the combination of a base-plate provided with a pair of rigid supporting-arms, guide-plate mechanism mounted upon one of such arms, a pivoted supporting-arm in sliding engagement with the other base-plate arm, guide-plate mechanism mounted upon the pivoted supporting-arm, and means for holding the pivoted arm in closed position and permitting it to be opened, substantially as described.

6. In mechanisms of the class described, the combination of a base-plate provided with a pair of rigid supporting-arms, a housing adjustably mounted upon one of such supporting-arms provided with a shield portion extending over the guide-plate mechanism, guide-plate mechanism mounted in such housing, a movable supporting-arm in sliding engagement with the other base-plate arm, guide-plate mechanism mounted upon such movable supporting-arm, a housing for such guide-plates provided with a shield portion extending over the guide-plate mechanism, and means for holding the movable supporting-arm in closed position with relation to the housing and permitting it to be opened, substantially as described.

7. In mechanisms of the class described, the combination of a base-plate, a pivoted supporting-arm mounted in sliding engagement with the base-plate, a supporting-bracket mounted at one end of the base-plate upon which such supporting-arm is pivotally mounted, guide-plate mechanism mounted upon such pivoted supporting-arm, guide-plates mounted independently of the supporting-arm, and means arranged at the end of the base-plate opposite to that on which the pivot-supporting bracket is mounted for holding the swinging end of the pivoted supporting-arm in closed position and permitting it to be opened, substantially as described.

8. In mechanisms of the class described, the combination of a base-plate, guide-plate mechanism mounted thereon, a pivoted supporting-arm arranged in sliding engagement therewith, a supporting-bracket arranged at one end of the base-plate upon which such supporting-arm is pivotally mounted, a locking-bracket arranged at the opposite end of the base-plate, means for locking the swinging end of the pivoted arm in closed position and permitting it to be opened, and means for adjusting the locking-bracket and supporting-bracket and holding them in position, substantially as described.

9. In mechanisms of the class described, the combination of a base-plate provided with a pair of rigid supporting-arms, a supporting-bracket mounted at one end of the base-plate, a guide-plate pivoted supporting-arm pivotally mounted in such bracket in sliding engagement with the opposite base-plate arm, guide-plate mechanism mounted in such pivoted supporting-arm, a locking-bracket mounted at the opposite end of the base-plate, means for holding the swinging end of the pivoted arm in engagement with the locking-bracket, guide-plates mounted independently of the movable supporting-arm, and means for adjusting the independently-mounted guide-plates independently of the locking and supporting brackets and holding them in position, substantially as described.

10. In mechanisms of the class described, the combination of a base-plate, guide-plate mechanism mounted thereon, a supporting-bracket, a locking-bracket mounted on the opposite end of the base-plate at each side of such guide-plate mechanism, a supporting-arm pivotally mounted in the supporting-bracket and provided with means for removably engaging the locking-bracket, guide-plate mechanism mounted upon such pivoted arm, means for holding the supporting-bracket and locking-bracket in position, means for adjusting the guide-plate mechanism arranged between such brackets, and means for adjusting the supporting and locking brackets and thereby the guide-plates of the movable supporting-arm holding such parts in position, substantially as described.

11. In mechanisms of the class described, the combination of guide-plates arranged on opposite sides of a saw to be guided thereby, housings in which such guide-plates are mounted provided with shield portions extending over the guide-plates, and a guard arranged at one end of such guide mechanism, substantially as described.

12. In mechanisms of the class described, the combination of guide-plates arranged on opposite sides of a saw to be guided thereby, movable housings provided with upper inclined surfaces extending over the guide-plates within which such guide-plates are mounted, and a guard arranged at one end of such guide mechanism, substantially as described.

13. In mechanisms of the class described, the combination of two sets of guide-plates arranged on opposite sides of a saw to be guided thereby, and supporting mechanism extending from one side of the saw beyond both edges and to the opposite side thereof upon which one set of such guide-plates are mounted, substantially as described.

14. In mechanisms of the class described, the combination of two sets of guide-plates arranged on opposite sides of a saw to be guided thereby, and connected supporting mechanism extending beyond both edges of the saw to the opposite sides thereof upon which such guide-plates are mounted, forming a lower guide, and an upper guide arranged above such lower guide in operative engagement with the saw, substantially as described.

15. In mechanisms of the class described, the combination of a base-plate pivotally mounted upon a suitable frame, two sets of guide-plates, means for attaching one set of such guide-plates to the base-plate, means for adjusting each of the guide-plates independently and holding them in operative position, an arm pivotally mounted on the pivoted base-plate for supporting the other set of guide-plates, and means for holding the swinging end of such arm in position, substantially as described.

16. In mechanisms of the class described, the combination of a base-plate, two sets of guide-plates arranged on opposite sides of a saw to be guided thereby, mechanism for supporting the guide-plates upon the base-plate, and means for adjustably attaching the guide-plate-supporting means to the base-plate comprising a plurality of holders, each slidably arranged in engagement with the base-plate and provided with adjusting-screws in threaded engagement therewith extending transversely of the base-plate, and a collar upon one end of each of such adjusting-screws in sliding engagement with the guide-plate-supporting mechanism, substantially as described.

17. In mechanisms of the class described, the combination of a base-plate movably mounted and provided with a slot extending longitudinally thereof, two sets of guide-plates arranged on opposite sides of a saw to be guided thereby, guide-plate-supporting mechanism arranged slidably upon such base-plate upon which such guide-plates are mounted, a plurality of holders slidably mounted in the longitudinal slot of the base-plate in engagement with the guide-plate-supporting mechanisms and movable longitudinally of the base-plate, and means for adjusting the guide-plate-supporting mechanisms transversely of the base-plate, substantially as described.

WILLIAM H. TROUT.
GEORGE M. HINKLEY.

Witnesses:
FRANK W. GREENLEAF,
J. SIDNEY HELLIWELL.